US 9,917,500 B2

United States Patent
Fleck et al.

(10) Patent No.: US 9,917,500 B2
(45) Date of Patent: Mar. 13, 2018

(54) SUPERCONDUCTIVE ELECTRO-MAGNETIC DEVICE FOR USE WITHIN A DIRECT CURRENT MOTOR OR GENERATOR

(71) Applicant: Dominion Alternative Energy, LLC, Alpharetta, GA (US)

(72) Inventors: Earl Enoch Fleck, Alpharetta, GA (US); Andrew Whitehead, Ila, GA (US)

(73) Assignee: Dominion Alternative Energy, LLC, Alpharetta, GA (US)

( * ) Notice: Subject to any disclaimer, the term of this patent is extended or adjusted under 35 U.S.C. 154(b) by 75 days.

(21) Appl. No.: 14/881,552

(22) Filed: Oct. 13, 2015

(65) Prior Publication Data
US 2016/0094093 A1 Mar. 31, 2016

Related U.S. Application Data

(63) Continuation of application No. 14/496,134, filed on Sep. 25, 2014, now Pat. No. 9,190,893.
(Continued)

(51) Int. Cl.
*H02K 1/14* (2006.01)
*H02K 1/17* (2006.01)
(Continued)

(52) U.S. Cl.
CPC ............... *H02K 55/00* (2013.01); *H02K 1/14* (2013.01); *H02K 1/17* (2013.01); *H02K 11/01* (2016.01); *H02K 23/02* (2013.01); *Y02E 40/62* (2013.01)

(58) Field of Classification Search
CPC . H02K 1/14; H02K 1/17; H02K 11/01; H02K 23/02; H02K 55/00; Y02E 40/62
(Continued)

(56) References Cited

U.S. PATENT DOCUMENTS 4,176,291 A * 11/1979 Rabinowitz .............. H02K 3/00
310/10
4,882,513 A 11/1989 Flygare et al.
(Continued)

FOREIGN PATENT DOCUMENTS

| CN | 103094998 | 5/2013 |
| JP | H06 72264 U | 10/1994 |
| JP | H09 242755 A | 9/1997 |

OTHER PUBLICATIONS

Li, Jiangui, "A Novel HTS PM Vernier Motor for Direct-Drive Propulsion", IEEE Transactions on Applied Superconductivity, vol. 21, No. 3, Jun. 2011, 1175-1179.
(Continued)

*Primary Examiner* — John K Kim
(74) *Attorney, Agent, or Firm* — Goodman Allen Donnelly PLLC; Charles M. Allen, Esq.; Matthew R. Osenga, Esq.

(57) ABSTRACT

A non-traditional topology of a superconductive electric motor or generator increases the air gap flux density by reducing stray flux and concentrating lines of flux within the air gap. An electric motor or generator utilizing the invention will include three components: a rotating armature, a permanent magnet stator and a shielding sleeve. The shielding sleeve of the motor is a hollow cylinder that fits between the armature and the stator, and is configured to cool a plurality of high-temperature superconductors within it to a temperature below their critical temperatures. These superconductors are placed at an optimized position to redirect flux and promote greater efficiency.

20 Claims, 4 Drawing Sheets

Related U.S. Application Data

(60) Provisional application No. 61/882,790, filed on Sep. 26, 2013.

(51) Int. Cl.
    *H02K 55/00*    (2006.01)
    *H02K 23/02*    (2006.01)
    *H02K 11/01*    (2016.01)

(58) Field of Classification Search
    USPC .................................................. 310/154.29
    IPC ............................................... H02K 1/14, 1/17
    See application file for complete search history.

(56) References Cited

U.S. PATENT DOCUMENTS

| | | |
|---|---|---|
| 5,256,638 A | 10/1993 | Weinberger et al. |
| 6,002,315 A | 12/1999 | Heiberger et al. |
| 6,570,277 B2 | 5/2003 | Tsuneyoshi et al. |
| 6,597,082 B1 * | 7/2003 | Howard ............... H02K 3/47 310/201 |
| 6,777,841 B2 | 8/2004 | Steinmeyer |
| 6,847,132 B2 | 1/2005 | Ukaji |
| 7,453,174 B1 * | 11/2008 | Kalsi .................. H02K 19/14 310/10 |
| 8,110,956 B2 | 2/2012 | Uenishi et al. |
| 8,319,588 B2 | 11/2012 | Calvert |
| 2002/0145355 A1 | 10/2002 | Maguire |
| 2003/0052554 A1 * | 3/2003 | Mawardi ............... H02K 55/04 310/52 |
| 2003/0184176 A1 * | 10/2003 | Steinmeyer .......... F16C 37/005 310/90.5 |
| 2005/0206270 A1 * | 9/2005 | Aisenbrey ............ H02K 1/02 310/251 |
| 2007/0052304 A1 | 3/2007 | Masson et al. |
| 2010/0264563 A1 * | 10/2010 | Cordes ................ H02K 11/042 264/272.14 |
| 2011/0248591 A1 | 10/2011 | Honkura et al. |
| 2011/0309726 A1 | 12/2011 | Carpenter et al. |
| 2012/0013217 A1 | 1/2012 | Bradfield |
| 2012/0165198 A1 | 6/2012 | Mizutani et al. |
| 2014/0274722 A1 | 9/2014 | Calved et al. |
| 2015/0087523 A1 | 3/2015 | Fleck et al. |
| 2016/0094093 A1 * | 3/2016 | Fleck ................... H02K 55/00 310/154.29 |

OTHER PUBLICATIONS

Supplementary European Search Report and Written Opinion of the European Patent Office issued in corresponding EP Application No. 14870070.1 and dated May 2, 2017.

* cited by examiner

SUPERCONDUCTIVE ELECTRO-MAGNETIC DEVICE FOR USE WITHIN A DIRECT CURRENT MOTOR OR GENERATOR

CROSS-REFERENCE TO RELATED APPLICATION

This application is a continuation of U.S. patent application Ser. No. 14/496,134, filed Sep. 25, 2014, now U.S. Pat. No. 9,190,893, which claims the benefit of U.S. Provisional Application No. 61/882,790, filed Sep. 26, 2013, the contents each of which are incorporated herein by reference.

FIELD OF THE INVENTION

The present invention relates generally to electric motors and generators that can be adapted for use in various systems or apparatuses. More specifically, the invention relates to an electro-magnetic device for use with a direct current motor and generator that provides improved efficiency through the use of superconductors.

BACKGROUND OF THE INVENTION

Electric motor construction that was developed in the 1800s uses a fixed placement of magnetic fields to initiate an electromotive force (EMF). An increase of electrical current induces a larger or stronger magnetic field causing a greater electromotive force at a higher and less efficient consumption rate. Therefore, a motor supplied with increased electrical current is limited to a particular RPM peak by a back EMF.

High temperature superconductors have been used to design electric motors due to their high current density and low DC losses. Such motors require cryogenic cooling systems to keep the temperature of the superconductors from rising too high.

A large portion of the electromagnetic energy lost by an electric motor is due to hysteresis and eddy currents. Hysteresis loss refers to the amount of electro-magnetic energy absorbed by ferrous metal when its magnetization is changed by the application of an alternating magnetic field. Eddy currents are currents unintentionally induced in conductive motor components by the fields in the motor. These currents produce magnetic fields opposite of those that operate the motor, and thus act as a form of magnetic drag on the motor. Thus, there is a need for an electric motor that decreases the energy losses due to these issues and provides increased efficiency.

SUMMARY OF THE INVENTION

The invention relates to various exemplary embodiments, including systems and apparatus for electric motors and generators that provide increased efficiency. These and other features and advantages of the invention are described below with reference to the accompanying drawings.

DETAILED DESCRIPTION

Figure 1:
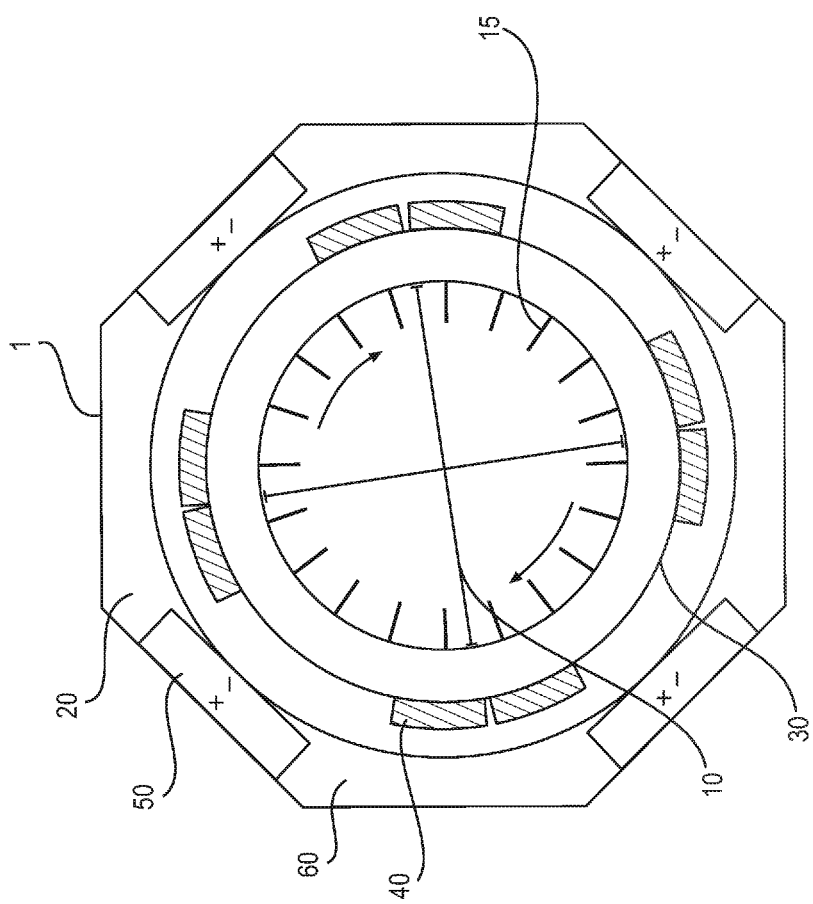
FIG. 1 is a sectional view or a topology of an electro-magnetic device in accordance with the invention.

The following description is merely exemplary in nature and is not intended to limit the present disclosure, application, or uses. It should be understood that throughout the drawings, corresponding reference numerals indicate like or corresponding parts and features.

Before the present invention is described in further detail, it is to be understood that the invention is not limited to the particular embodiments described, and as such, may of course vary. It is also to be understood that the terminology used herein is for the purpose of describing particular embodiments only, and is not intended to be limiting, since the scope of the present invention will be limited only by the appended claims.

A number of materials are identified as suitable for various aspects of the invention. These materials are to be treated as exemplary and are not intended to limit the scope of the claims. Although any methods and materials similar or equivalent to those described herein can also be used in the practice or testing of the present invention, a limited number of the exemplary methods and materials are described herein.

It must be noted that as used herein and in the appended claims, the singular forms "a", "an", and "the" include plural referents unless the context clearly dictates otherwise.

The implementations of the present invention described herein are used to increase the efficiency of a superconductive electric motor or generator by increasing its air gap flux density and decreasing losses due to hysteresis and eddy currents. In addition, the present invention utilizes a large number of standard motor components, and therefore a motor or generator in accordance with the present invention can interface with standard mechanical systems with minimal modification, and can be manufactured using standard and cost-effective processes. It will be understood that, as used herein, the term "motor" can also refer to the inverse, a "generator" and vice versa.

In the event that a rotational force is applied to the shaft of the invention, it will act as a generator, supplying power to any load connected to the terminals. The same properties of the invention that would increase its efficiency as a motor will also increase its efficiency as a generator. The invention will result in an increased efficiency, whether used as a motor or generator regardless of its primary application. The reverse conversion of mechanical energy into electrical energy is done by a generator. Motors and generators have many similarities, and many existing motors can be driven to generate electricity.

Exemplary embodiments of the present invention might significantly increase the available driving range of a battery pack in a vehicle and make non-hybridized electric vehicles viable to everyday commuters. As a result, it might facilitate a viable transition from gasoline propulsion vehicles to electric, non-hybridized vehicles.

As shown in FIG. 1, an electro-magnetic device 1 in accordance with an embodiment of the present invention includes a rotating armature 10, a permanent magnet stator 20, and a shielding sleeve 30. The rotating armature 10 is shown at the center of the motor 1 and associated with bearings and a brush assembly (not shown). Such armatures 10 typically include windings 15 located thereon.

The shielding sleeve 30 is a hollow cylinder that fits between the armature 10 and the stator 20. The shielding sleeve 30 is configured to cool a plurality of high-temperature superconductors 40 located within the sleeve 30 to a temperature below the critical temperature of the superconductors 40. High-temperature superconductors 40 with critical temperatures of about 100K, can be cooled by a fairly simple cryo-cooler, or alternatively by liquid nitrogen (LN2), which has a boiling-point of 77.4 K. There are two principal high-temperature superconducting materials: Yttrium-Barium-Copper-Oxide (YBa2Cu3O7, or YBCO), and Bismuth-Strontium-Calcium-Copper-Oxide (BSCCO). In one exemplary embodiment of the present invention, the device 1 uses YBCO to induce a diamagnetic repulsion field. YBCO exhibits the highest current density. Its critical temperature is around 90K allowing its use at liquid nitrogen temperature. At 77K, this material can trap about 1.3 Tesla (T) of magnetic flux and more than 6 T below 50K.

Figure 2:
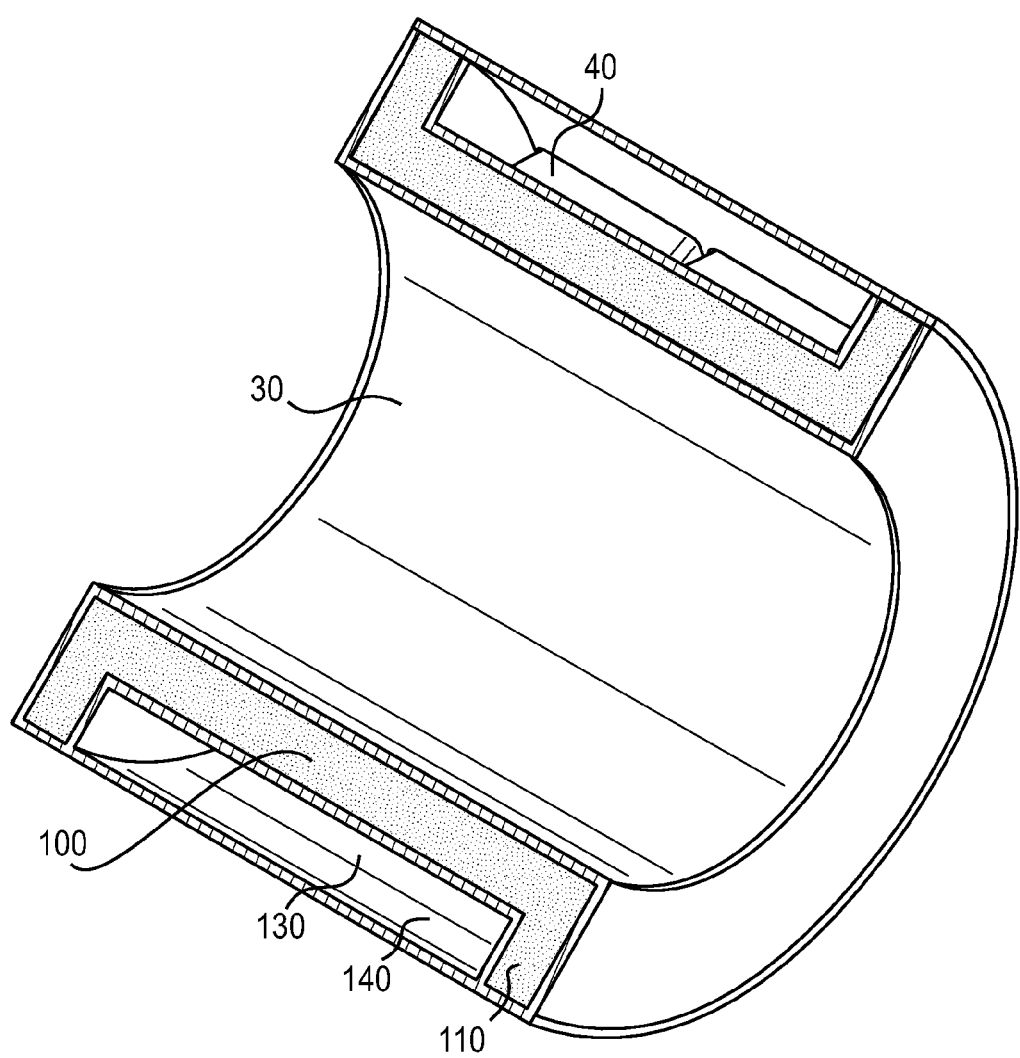
FIG. 2 is a sectional view of a shielding sleeve as shown in FIG. 1.

Referring to FIG. 2, the inner core of the sleeve 30 is formed of an urethane foam, such as about 1" thick insulated hollow cylinder 100 of 3 lb/ft$^3$ urethane foam. The cylinder 100 is encased in a fiberglass housing formed of resin that is capable of withstanding cryogenic temperatures. The fiberglass enclosure is mandrel wound to a thickness of about 3/16". Insulated end caps 110 of similar composition are attached to the ends of the central cylinder 100. These end caps 110 have an inner diameter of about 6" and an outer diameter of about 10". $LN_2$ can be introduced within the cylinder 100 to provide cooling for the superconductors. One of these end caps 110 has a nitrogen introduction port that is fitted to receive the phase separator of a bulk liquid nitrogen tank. The other end cap 110 has a gas port that allows evaporated nitrogen to escape from the sleeve 30.

Figure 3:
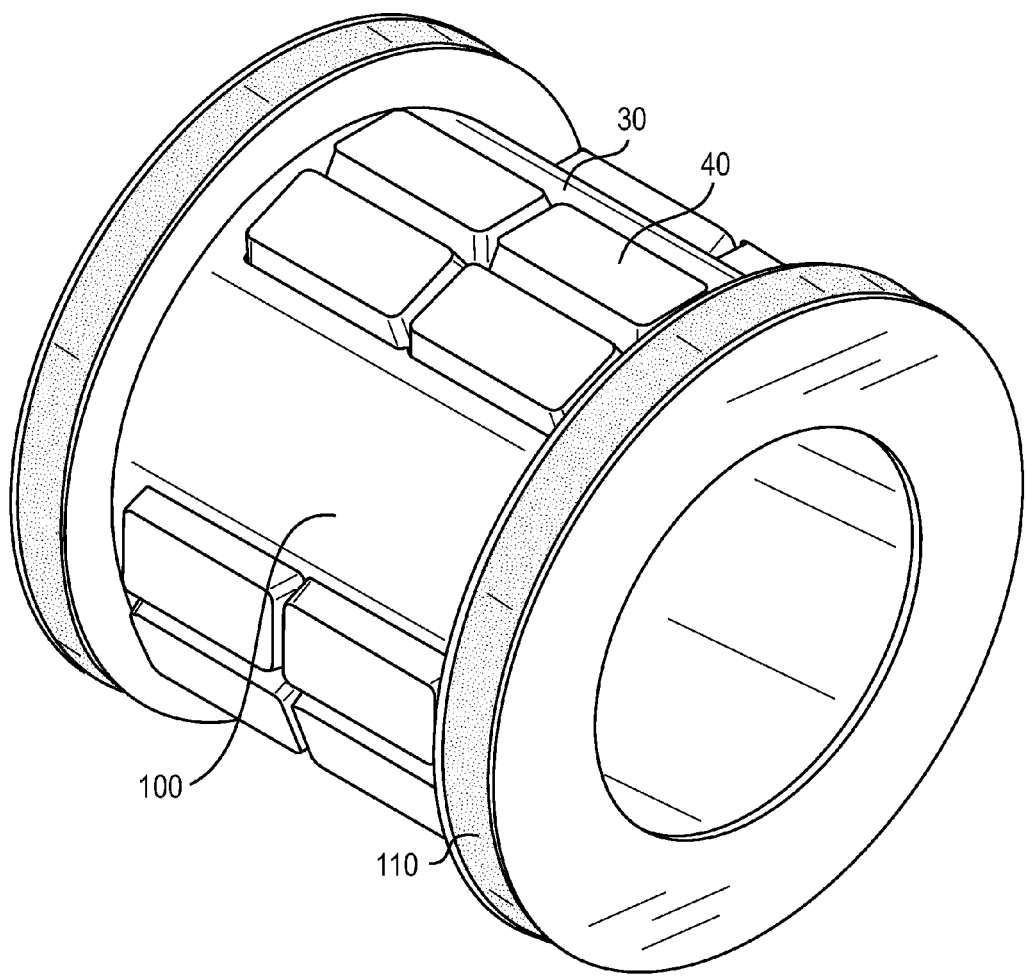
FIG. 3 is a perspective view of the inner structure of the shielding sleeve as shown in FIG. 2.
Figure 4:
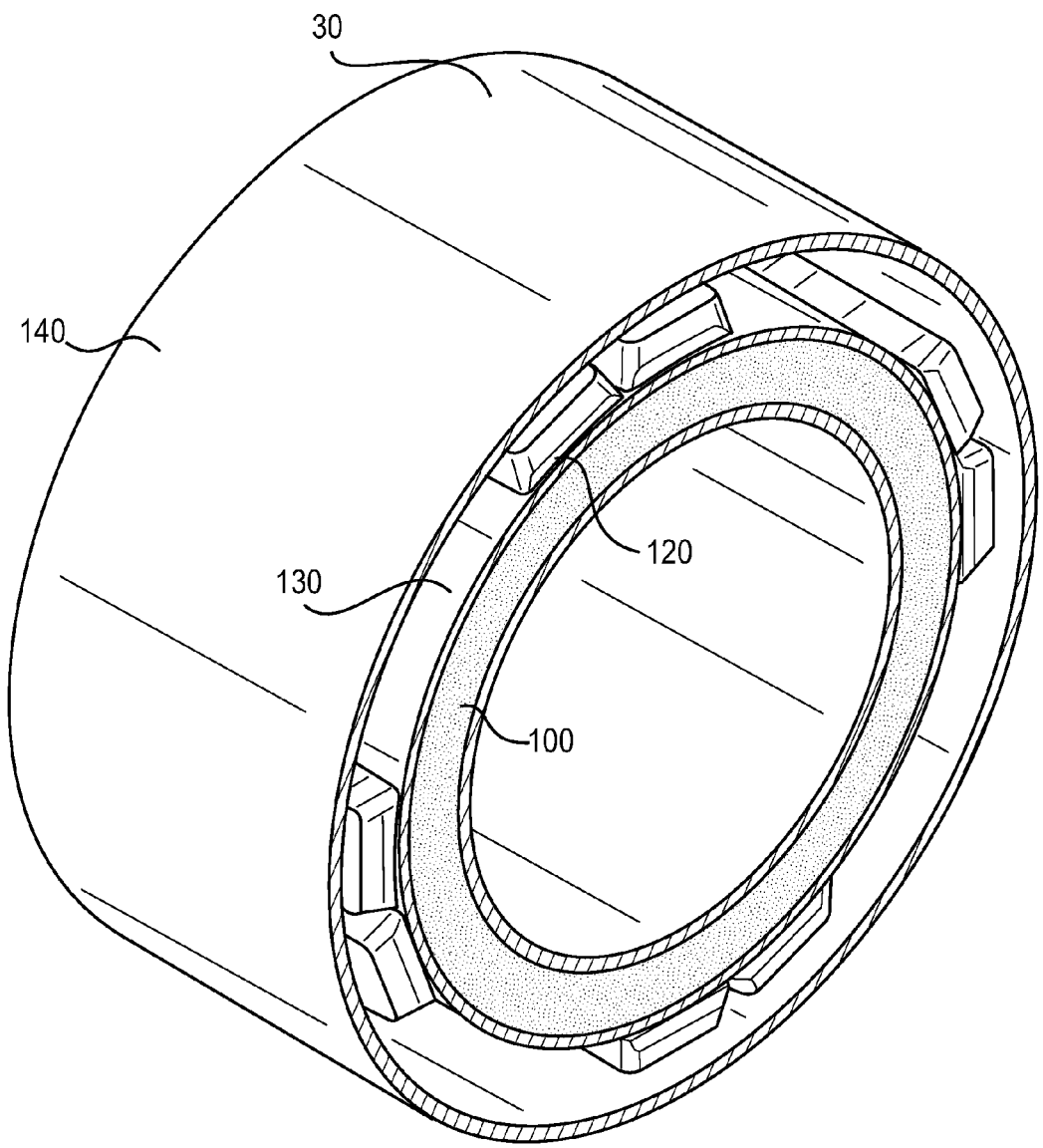
FIG. 4 is a perspective view of a shielding sleeve as shown in FIG. 1.

Referring to FIGS. 3 and 4, a plurality YBCO 123 superconductive bulk plates 40 are mounted to the outer surface of the hollow cylinder 100, between the end caps 110. The superconductive bulk plates 40 each have dimensions of about of 3"×1½"×½". The bulk plates 40 are arranged in four sets, each of which has overall dimensions of about 3"×6|×½". Each set of bulk plates 40 covers an arc of approximately 45°. As shown in FIG. 4, all four sets of bulk plates 40 are uniformly distributed around the cylinder 100 so that there is also an arc of approximately 45° between them, i.e., the gap is also about 45°. While this arrangement provides optimal results, other arc and gap measurements are also within the scope of the present invention. Additional bulk fiberglass (not shown) can be inserted beneath each bulk plate 40 in order to provide a flat contact surface and prevent cracking of the plates. The bulk plates 40 are held in place by a fiberglass enclosure 120 adhered to the inner cylinder 100, which is perforated to allow greater thermal contact between liquid nitrogen in the sleeve 30 and the bulk plates 40.

Referring to FIGS. 2 and 4, surrounding the inner cylinder 100 of the sleeve 30, there is a hollow cylinder 130 made of fiberglass. The cylinder 130 has an outer diameter of about 10" and a thickness of about 3/16". It slides over the end caps 110 and seals against them, forming the outer wall 140 of the sleeve 30. A void is enclosed between the inner cylinder 100 and the outer wall 140, and is sealed on the ends by the end caps 110. This void contains the bulk plates 40, and also serves as a nitrogen bath to cool the bulk plates 40 to their critical temperature. $LN_2$ can be introduced into this void space to provide the necessary cooling.

The permanent magnet stator 20 illustrated in FIG. 1 is designed to accommodate the sleeve 30. In this implementation, it is designed as an octagon made of aluminum bar stock having dimensions of about 5"×½"×14" long. Each end of stator housing 60 is enclosed with a ½" thick octagonal aluminum end plate. Rare earth magnets 50 having dimensions of about 1"×3"×6" are attached to the housing 60 at 90° intervals. The magnets 50 are affixed with alternate poles facing inward, so that like poles face each other across the main axis of the device 1. Other types of magnets 50—conventional, rare earth, electromagnet, even superconductive windings—could also be used according to the present invention. Variation in the types of magnets used would cause a variation in the shapes and geometries of the magnetic fields. The optimal shielded arc would vary with magnet type, composition, and geometry.

The stator housing 60 can be constructed in two halves with the end plates being attached to the lower half. This permits access to the sleeve 30. Flanges are welded to the halves, allowing them to be bolted together.

All void space between the stator housing 60 and the sleeve 30 is filled with 3 lb/ft$^3$ urethane foam. The foam insulates the outer wall 140 of the sleeve 30 from the housing 60, and thus reduces the heat load on the nitrogen bath. It also provides a friction fit on the sleeve 30 by locking it in place when the stator flange bolts are tightened.

Prior to operating the device 1 with a motor or generator, the sleeve 30 is rotated manually within the stator 20 so that each set of bulk plates 40 is aligned between the stator poles. Liquid nitrogen is then introduced into the sleeve 30 to cool the bulk plates 40 to their critical temperature. Once the bulk plates 40 reach their critical temperature, the magnetic flux generated by the stator magnets 50 is trapped inside the bulk plates 40. The sleeve 30 is then rotated 90° so that the trapped flux is opposite in polarity to the magnet nearest to it. At this point the device 1 is operational.

These bulk plates 40 are flooded with low pressure liquid nitrogen and the cryo-unit holds them at an optimized position in front of four neodymium magnets 50. These fields generated are above an armature that generates a field for EMF. Other magnets can be used within the scope of the invention as may be desired.

The implementation described utilizes liquid nitrogen to cool and insulate the superconductors. Other implementations could utilize conductive cooling or other types of cooling mechanisms known to those with skill in the art. If thermal conduction is used to cool the superconductors, the sleeve would be formed of a thermally conductive material.

This design increases the efficiency of the motor or generator by reducing stray flux. The activated bulk plates 40 increase the air gap flux density and concentrate the lines of flux between them. This flux is in the optimum area to interact with the armature fields and produce positive torque. The reversed polarity of the flux trapped in the bulk plates 40 cancels flux from the stator fields near the edges of the plates, leaving only the concentrated field between the plates to interact with the armature. In the reverse direction, the armature fields are likewise concentrated by the bulk plates 40 and focused on the stator magnets 50. As a result, losses due to hysteresis currents and eddy currents are reduced.

Example

A 1 horsepower motor was mounted on a test stand so that it would drive a belt and pulley system, driving the prototype as a generator according to the invention. A power meter was connected to the power supply of the drive motor to measure the input power. The leads of the device were connected to a 45 watt light bulb within the circuit path. The current produced by the prototype motor was measured using an ExTech MA220 ammeter; the voltage produced was captured using a Snap-On M.O.D.I.S. running 12.2 software.

By varying the combination of pulleys used to connect the two machines, the motor could be driven at one of four speeds: 3510, 2995, 2630, and 1910 rpm.

The testing began with what is referred to as the conventional motor test. This test consisted of running the motor up to speed without activating the superconductive bulk plates and recording the power consumed by the drive motor and the light bulb. This test was run ten times at all four speeds. After this test was run, the sleeve was set in one of two positions (+5 or −5) and activated. In these positions, the bulk plates are aligned radially between the stator field magnets. The two positions are 90 degrees apart, so the only difference between them is which superconductor is aligned between each pair of stator magnets. Ten tests were then run at each speed. After these tests were run, the sleeve was rotated 90 degrees to the opposite position (+5 or −5) and ten more tests would be run at each speed. This resulted in tests being run with the sleeve activated at +5 and operated at +5 and −5, and with the sleeve being activated at −5 and run at −5 and +5. In total, 16 series of ten tests were run; one at each speed for each possible combination activation and operation points. The data are shown below.

| Speed (rpm) | % Increase In Efficiency Over Conventional Motor | | | |
|---|---|---|---|---|
| | +5, +5 | +5, −5 | −5, −5 | −5, +5 |
| 3510 | 22.12% | 25.75% | 29.92% | 30.73% |
| 2995 | −2.35% | 8.27% | 11.51% | 5.92% |
| 2630 | 10.04% | 10.06% | 8.72% | 12.51% |
| 1910 | 9.40% | 15.91% | 15.74% | 24.19% |

The results of these tests are clear. 15 of the 16 test series showed statistically significant increases in efficiency over the non-activated motor with an average increase of 14.9% efficiency above the non-activated invention operating at the same speed. As noted above, this test was intended to prove the concept of the invention. It did not provide an exact estimate of how much the invention will increase the efficiency of a DC motor operating in its intended use. The efficiency of the device did increase when the sleeve was activated, proving that it did produce a significant reduction in stray loads (hysteresis and eddy currents). The invention will have the same effect on a motor, but the magnitude of the reduction in stray loads will be affected by the geometry of the motor and its magnetic fields.

Numeric values and ranges are provided for various aspects of the implementations described above. These values and ranges are to be treated as examples only and are not intended to limit the scope of the claims.

While the invention has been described in conjunction with specific exemplary implementations, it is evident to those skilled in the art that many alternatives, modifications, and variations will be apparent in light of the foregoing description. Accordingly, the invention is intended to embrace all such alternatives, modifications, and variations that fall within the scope and spirit of the appended claims.

What is claimed is:

1. A superconductive electro-magnetic device for use within a direct current motor or generator that includes an armature that rotates when a rotational force is applied thereto, the armature having windings thereon, and a stator within which the armature rotates, the stator including at least two magnets and having respective gaps between each adjacent magnet, the device comprising:
   a hollow shielding sleeve locked in place with the stator relative to the armature, the shielding sleeve having an inner wall and an outer wall, such that a cooling fluid can flow within the shielding sleeve; and
   a plurality of superconductor plates arranged in sets within the shielding sleeve and having gaps between each set, wherein each gap is located between the armature windings and the stator magnets and each set of plates is radially aligned with the respective gaps between adjacent stator magnets.

2. The device of claim 1, wherein the cooling fluid is liquid nitrogen.

3. The device of claim 1, wherein the superconductor plates are formed of yttrium-barium-copper-oxide or bismuth-strontium-calcium-copper-oxide.

4. The device of claim 1, wherein the shielding sleeve includes an inner core formed of urethane foam.

5. The device of claim 4, wherein the inner core is encased in a fiberglass housing.

6. The device of claim 4, wherein the inner core includes insulated end caps.

7. The device of claim 1, wherein the superconductor plates are attached to the inner wall of the shielding sleeve.

8. The device of claim 7, wherein bulk fiberglass provides a flat contact surface between the superconductor plates and the shielding sleeve.

9. The device of claim 1, wherein the stator includes rare earth magnets attached to a housing located at each end of the stator.

10. The device of claim 9, wherein the magnets are neodymium magnets.

11. The device of claim 1, wherein the magnets are permanent magnets or electromagnets.

12. The device of claim 1, wherein the magnets are superconductive electromagnets.

13. The device of claim 1, wherein the armature windings are electromagnetic windings.

14. The device of claim 1, wherein the armature windings are superconductive windings.

15. A superconductive electro-magnetic device for use within a direct current motor or generator that includes an armature that rotates when a rotational force is applied thereto, the armature having windings thereon, and a stator within which the armature rotates, the stator including at least two magnets and having respective gaps between each adjacent magnet, the device comprising:
    a shielding sleeve locked in place with the stator relative to the armature, the shielding sleeve being formed of a thermally conductive material; and
    a plurality of superconductor plates grouped together in sets and having a gap between each set, such that each set is radially aligned with the respective gaps between adjacent stator magnets.

16. The device of claim 15, wherein the superconductor plates are formed of yttrium-barium-copper-oxide or bismuth-strontium-calcium-copper-oxide.

17. The device of claim 15, wherein the magnets are permanent magnets or electromagnets.

18. The device of claim 15, wherein the magnets are superconductive electromagnets.

19. The device of claim 15, wherein the armature windings are electromagnetic windings.

20. The device of claim 15, wherein the armature windings are superconductive windings.

* * * * *